Patented Apr. 1, 1952

2,591,313

UNITED STATES PATENT OFFICE 2,591,313

PROCESS FOR PRODUCING ALPHA-(METAL-LO-FORMYL)-BETA-ALKOXY-PROPIONIC ACID ESTERS

Gustav A. Stein, Plainfield, N. J., and Joseph R. Stevens, Easton, Pa., assignors to Merck & Co., Inc., Rahway, N. J., a corporation of New Jersey No Drawing. Original application April 10, 1946, Serial No. 661,086. Divided and this application May 16, 1950, Serial No. 162,382

4 Claims. (Cl. 260—484)

This invention is concerned generally with novel processes for preparing intermediates useful in the synthesis of vitamin $B_1$. More particularly it relates to an improved method for the manufacture of 2-methyl-4-hydroxy-5-alkoxymethyl-pyrimidine.

This application is a division of application Serial No. 661,086, filed April 10, 1946, now Patent No. 2,516,158.

Vitamin $B_1$ is known to be 4-methyl-5-$\beta$-hydroxyethyl-N-[2-methyl-4-amino-pyrimidyl-(5)-methyl] thiazolium chloride hydrochloride which can be represented by the following structural formula:

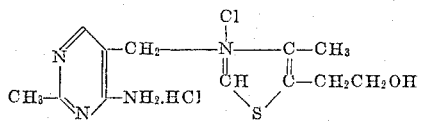

Vitamin $B_1$ can be synthesized from a 2-methyl-4-hydroxy-5-alkoxymethyl-pyrimidine, namely the 5-ethoxymethyl-derivative, by a process described in J. A. C. S. 59, 1052. It is known that the above intermediate 2-methyl-4-hydroxy-5-ethoxymethyl-pyrimidine can be obtained by reacting metallic sodium with ethyl formate and $\beta$-ethoxyethyl-propionate and condensing the resulting $\alpha$-sodio-formyl-$\beta$-ethoxyethyl-propionate with acetamidine hydrochloride. The ethyl-$\beta$-ethoxypropionate can be prepared according to one prior art process by reacting ethyl acrylate with metallic sodium in ethyl alcohol solution. The overall process possesses various disadvantages, namely: (1) the process is a three-step process involving the preparation of ethyl-$\beta$-ethoxy-propionate, reaction of this compound with ethyl formate, and reaction of this product with acetamidine hydrochloride; (2) the first two steps employ sodium metal which requires special equipment and is hazardous in commercial operation; (3) the process requires isolation and purification of the intermediate ethyl-$\beta$-ethoxy-propionate. This purification step is necessary since it has been found that when crude ethyl-$\beta$-ethoxy-propionate is employed it interferes in subsequent operations and that a poor yield and low quality pyrimidine derivative results. The purification requires costly distillation columns containing a large number of equivalent theoretical plates in order to separate the ethyl-$\beta$-ethoxy-propionate from the undesirable contaminating materials; furthermore, due to the possibility of decomposition, it is preferred to conduct this fractionation under reduced pressure, a difficult operation to carry out under plant conditions and one likely to be attended by considerable losses of product. In view of these difficulties, the overall yield from ethyl acrylate according to prior art processes has always been limited to about 30% of theory.

The present invention is concerned with a novel process which can be carried out in a single reaction vessel without isolation of intermediate product, whereby a 2-methyl-4-hydroxy-5-alkoxymethyl-pyrimidine is prepared from an acrylic acid ester in yields of about 50% of that theoretically obtainable. In this process an acrylic acid ester is condensed with a formic acid ester and an alkali metal alcoholate, and the crude product (which contains $\alpha$-metallo-formyl-$\beta$-alkoxy-propionic ester) is reacted directly without isolation with acetamidine hydrochloride.

In carrying out the process according to the present invention, a mixture of an acrylic acid ester such as ethyl acrylate, methyl acrylate, phenyl acrylate, benzyl acrylate and the like, is reacted with a formic acid ester such as ethyl formate, methyl formate, propyl formate, phenyl formate, benzyl formate, and the like, and an alkali metal alcoholate, such as sodium ethylate, sodium methylate, potassium ethylate and the like. The alkali metal alcoholate can be prepared if desired, in the same reaction vessel by reacting the appropriate alkali metal with an aliphatic alcohol, but it is presently preferred to use technical sodium ethylate. The reaction can be conducted between the components alone or in the presence of a hydrocarbon diluent which is a non-solvent for the starting materials and products such as petrolatum, benzene, toluene, xylene, solvent naphtha and the like. Any temperature below about 40° can be employed but applicants prefer using a temperature of about 30–35° C. The reaction is conveniently controlled by adding the mixture of formic ester and acrylic ester with stirring and over a period of about 1 hour to the slurry of alkali metal alcoholate in a diluent; the mixture is then allowed to stir until reaction is substantially complete which requires about 20 hours. This reaction may be chemically represented, in the case of applicants' preferred process, employing ethyl acrylate, ethyl formate and sodium ethylate, as follows:

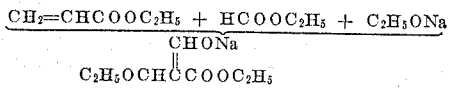

The crude product obtained in the above reaction can be reacted directly with acetamidine hydrochloride to produce the corresponding pyrimidine derivative. This condensation is best conducted in aqueous solution and in the absence of oxygen at below about 15° C., preferably at about 0–5° C. The temperature is conveniently regulated by adding the acetamidine hydrochloride dissolved in ice water solution portionwise and with cooling to the crude α-sodio-formyl-β-alkoxy-propionic ester reaction product. The reaction mixture should preferably be protected from oxidation which can be accomplished by maintaining an atmosphere of nitrogen or other inert gas above the batch in the reaction vessel. In order to obtain maximum overall conversion of the acrylic acid ester to the pyrimidine compound, it has been found best to use an excess of each of the other reactants; in the case of the acetamidine, an amount approximately equivalent to the acrylic acid ester originally employed is first added in aqueous solution and the mixture allowed to react for about 1 hour; the aqueous layer, containing the 2-methyl-4-hydroxy-5-alkoxy-methyl-pyrimidine is then separated and an additional equivalent of acetamidine hydrochloride is added together with sufficient sodium hydroxide to neutralize the hydrochloric acid content and the resulting solution is allowed to react at about 0–5° C. for an additional 24 hours. The pyrimidine derivative is recovered from this solution by any convenient method; for example by extracting the impurities with ether, then adjusting with acetic acid to a pH of approximately 6 and then extracting the desired 2-methyl-4-hydroxy-5-alkoxy-methyl - pyrimidine therein by means of a solvent such as chloroform, ethylene dichloride, carbon disulfide, and the like. This reaction may be chemically represented, in the case of applicants' preferred process, employing α-sodio-formyl-β-ethoxy-propionate and acetamidine hydrochloride, as follows:

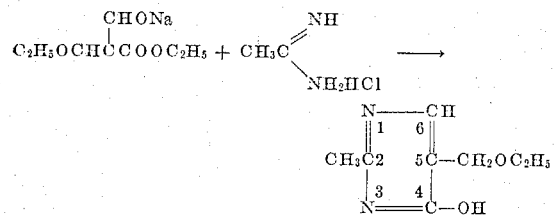

The following examples illustrate methods of carrying out the present invention, but it is to be understood that they are given by way of illustration and not of limitation.

*Example 1*

About 67 g. of sodium ethylate is suspended in about 400 cc. petrolatum and a mixture of about 50 g. of ethyl acrylate and 74 g. of ethyl formate is added thereto with stirring over approximately a one-hour period and at a temperature of about 30–35° C. The mixture which contains α-sodio-formyl-β-ethoxy-ethyl-propionate is cooled to about 0–5° C. and to this mixture is added, under an atmosphere of nitrogen, a solution containing about 48 g. of acetamidine hydrochloride, dissolved in about 124 g. of ice water. The mixture is stirred for approximately 1 hour, the aqueous layer is separated and to this aqueous solution is added an additional quantity of about 58 g. acetamidine hydrochloride and about 19 g. of sodium hydroxide. The resulting solution is allowed to stand for approximately 24 hours at about 0–5° C. and is then extracted twice with approximately 50 cc. portions of ether and sufficient acetic acid is added to the aqueous layer to bring the pH to approximately 6. This solution is then extracted repeatedly with chloroform and the chloroform extract evaporated to dryness to produce about 52 g. of crude product which corresponds to about 73% theoretical yield. This crude material can be purified if desired by washing with acetone to produce substantially pure 2-methyl-4-hydroxy-5-ethoxy - methyl - pyrimidine; M. P. 177–178° C. Yield of purified material about 48% of theory.

*Example 2*

Two experiments were carried out in each of which 50 g. of ethyl acrylate was reacted with 76 g. of ethyl formate and 67 g. of sodium ethylate substantially as described in Example 1 and the product reacted with 105 g. of acetamidine hydrochloride. The aqueous layer was separated from the reaction mixture and extracted repeatedly with chloroform and the chloroform extract evaporated to produce crude material which was purified by washing with acetone. The yield of acetone-washed 2 - methyl - 4 - hydroxy - 5 - ethoxy-methyl-pyrimidine (M. P. 177–178° C.) was 37 g. in one experiment and 41 g. in the other.

A comparative experiment was conducted using the process described in the literature and starting with 50 g. of ethyl acrylate. 60 g. of substantially pure ethyl β-ethoxy-propionate was obtained which was reacted with 30 g. of ethyl formate and 61 g. of acetamidine hydrochloride. This gave 26 g. of acetone-washed 2-methyl-4-hydroxy-5-ethoxy-methyl-pyrimidine (M. P. 177–178° C.)

It is thus seen that the yield by our improved method is between 40 and 60% higher than that obtainable by the prior art process.

Modifications may be made in carrying out the present invention without departing from the spirit and scope thereof and the invention is to be limited only by the appended claims.

We claim:

1. The process which comprises simultaneously reacting, at a temperature below about 40° C., an acrylic ester with an alkyl formate and an alkali metal alcoholate to produce an α-(metallo-formyl)-β-alkoxy-propionic ester.

2. The process which comprises simultaneously reacting, at a temperature below about 40° C., a mixture containing an acrylic ester, an alkyl formate and an alkali metal alcoholate, said reaction being carried out by adding a mixture of acrylic ester and formic ester to a suspension of alkali metal alcoholate in a hydrocarbon diluent to produce an α-(metallo-formyl)-β-alkoxy-propionic ester.

3. The process which comprises simultaneously reacting, at a temperature of about 30–35° C., ethyl acrylate, ethyl formate and sodium ethylate to produce ethyl α-(sodio-formyl)-β-ethoxy-propionate.

4. The process which comprises simultaneously reacting at a temperature of approximately 30–35° C. a mixture containing ethyl acrylate, ethyl formate, and sodium ethylate, said reaction being carried out by adding a mixture of ethyl acrylate and ethyl formate to a suspension of sodium ethylate in petrolatum, to produce ethyl α-(sodio-formyl)-β-ethoxy-propionate.

GUSTAV A. STEIN.
JOSEPH R. STEVENS.

REFERENCES CITED

The following references are of record in the file of this patent:

UNITED STATES PATENTS

| Number | Name | Date |
|---|---|---|
| 2,516,158 | Stein et al. | July 25, 1950 |